United States Patent
Bare, II et al.

(10) Patent No.: US 9,832,260 B2
(45) Date of Patent: Nov. 28, 2017

(54) DATA MIGRATION PRESERVING STORAGE EFFICIENCY

(71) Applicant: NetApp, Inc., Sunnyvale, CA (US)

(72) Inventors: Keith Bare, II, Pittsburgh, PA (US); Jonathan Curley, Pittsburgh, PA (US)

(73) Assignee: NetApp, Inc., Sunnyvale, CA (US)

( * ) Notice: Subject to any disclaimer, the term of this patent is extended or adjusted under 35 U.S.C. 154(b) by 342 days.

(21) Appl. No.: 14/494,450

(22) Filed: Sep. 23, 2014

(65) Prior Publication Data

US 2016/0088080 A1 Mar. 24, 2016

(51) Int. Cl.
*H04L 29/08* (2006.01)
*G06F 3/06* (2006.01)

(52) U.S. Cl.
CPC ........ *H04L 67/1095* (2013.01); *G06F 3/0619* (2013.01); *G06F 3/0647* (2013.01); *G06F 3/0685* (2013.01); *H04L 67/1097* (2013.01)

(58) Field of Classification Search
CPC ............ H04L 67/1095; H04L 67/1097; G06F 3/0685; G06F 3/0647; G06F 3/0619
See application file for complete search history.

(56) References Cited

U.S. PATENT DOCUMENTS

| | | | | |
|---|---|---|---|---|
| 7,320,009 B1* | 1/2008 | Srivastava | ........ | G06F 17/30215 707/625 |
| 8,032,498 B1* | 10/2011 | Armangau | ........ | G06F 17/30088 707/690 |
| 8,078,816 B1* | 12/2011 | Thoppai | ............ | G06F 17/30215 711/162 |
| 8,190,850 B1* | 5/2012 | Davenport | ........ | G06F 17/30067 711/170 |
| 8,412,688 B1* | 4/2013 | Armangau | ........ | G06F 17/30088 707/690 |
| 9,323,758 B1* | 4/2016 | Stacey | ............... | G06F 17/30156 |
| 2002/0095399 A1* | 7/2002 | Devine | ............... | G06F 17/3089 |
| 2007/0100913 A1* | 5/2007 | Sumner | ............... | G06F 11/1453 |
| 2007/0250552 A1* | 10/2007 | Lango | .................... | G06F 15/167 |
| 2009/0132619 A1* | 5/2009 | Arakawa | ............... | G06F 3/0605 |
| 2010/0205389 A1* | 8/2010 | Kishi | .................. | G06F 11/1453 711/162 |
| 2010/0235332 A1* | 9/2010 | Haustein | ........... | G06F 17/30315 707/692 |

(Continued)

*Primary Examiner* — Dustin Nguyen
*Assistant Examiner* — Javier O Guzman
(74) *Attorney, Agent, or Firm* — Gilliam IP PLLC

(57) ABSTRACT

Technology is disclosed for a data migration process for a storage server that preserves storage efficiency information. The storage server receives an indication of a group of two or more files and selects among the two or more files a reference file and one or more selected files. The storage server initiates a first migration operation to copy or move the reference file from a source storage server to a destination storage server. The storage server initiates one or more additional migration operations to copy or move the selected files from the source storage server to the destination storage server. At least one of the additional migration operations include a step of transmitting to the destination storage server data blocks of the selected files that are not shared between the reference file and the selected files, but avoid transmitting to the destination storage server the blocks shared with the reference file.

17 Claims, 11 Drawing Sheets

(56) References Cited

U.S. PATENT DOCUMENTS

| | | | |
|---|---|---|---|
| 2011/0218973 A1* | 9/2011 | Pendlebury | G06F 17/30156 707/692 |
| 2012/0054367 A1* | 3/2012 | Ramakrishnan | G06F 9/4856 709/242 |
| 2013/0054530 A1* | 2/2013 | Baker | G06F 17/30079 707/639 |
| 2013/0080389 A1* | 3/2013 | Curley | G06F 17/30215 707/639 |
| 2013/0218848 A1* | 8/2013 | Gunda | H04L 67/1097 707/692 |
| 2014/0019412 A1* | 1/2014 | Moollard | G06F 11/1453 707/610 |
| 2015/0370827 A1* | 12/2015 | Parkison | G06F 17/30215 707/626 |

* cited by examiner

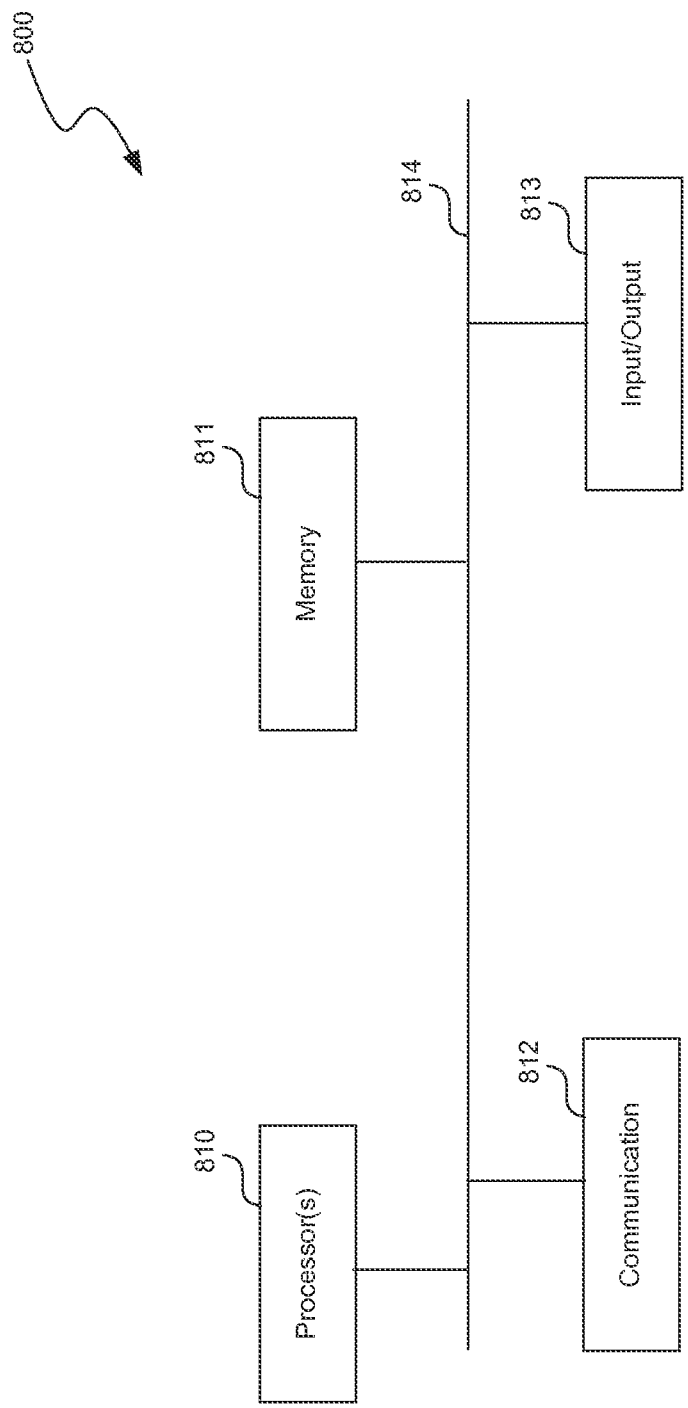

DATA MIGRATION PRESERVING STORAGE EFFICIENCY

BACKGROUND

Clusters of computing devices are used to facilitate efficient and cost effective storage of large amounts of digital data. For example, a cluster network environment of computing devices ("nodes") may be implemented as a data storage system to facilitate the creation, storage, retrieval, and/or processing of digital data. Such a data storage system may be implemented using various storage architectures, such as a network-attached storage (NAS) environment, a storage area network (SAN), a direct-attached storage environment, and combinations thereof. The data storage systems may comprise one or more data storage devices configured to store digital data within data volumes.

Digital data stored by data storage systems may be frequently migrated within the data storage system and/or between data storage systems, such as by copying, cutting and pasting, replication, backing up and restoring, etc. For example, a user may move files, folders, or even the entire contents of a data volume from one data volume to another data volume. Likewise, a data replication service may replicate the contents of a data volume across nodes within the data storage system. Irrespective of the particular type of data migration performed, migrating large amounts of digital data may consume significant amounts of available resources, such as central processing unit (CPU) utilization, processing time, network bandwidth, etc. Moreover, migrating digital data may take substantial amounts of time to complete the migration between the source and destination.

BRIEF DESCRIPTION OF THE DRAWINGS

These and other objects, features and characteristics of the present invention will become more apparent to those skilled in the art from a study of the following detailed descriptions in conjunction with the appended claims and drawings, all of which form a part of this specification. In the drawings:

FIG. 8 is a block diagram illustrating an example of computer system in which at least some operations related to the technology disclosed herein can be implemented.

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment or all embodiments, however.

Technology for providing a data migration process that preserves storage efficiency is disclosed herein ("the technology"). Storage efficiency technologies can cause data to occupy a smaller amount of physical space than the logical size of the data. Such technologies significantly reduce overall storage requirements, and consequently cost. Examples of storage efficiency technologies are deduplication, compression, file clones, LUN clones, thin provisioning, etc. For example, the data deduplication technology eliminates duplicate copies of repeating data, by identifying redundant data chunks (e.g., data blocks) inside individual files and replacing the redundant data chunks with references that point to the already stored chunks.

However, traditional data migration techniques cannot preserve the storage efficiency information. Such a traditional data migration technique utilizes a logical transfer of data that examines the actual contents of the file, but generally not the references (e.g., pointers) that point to the locations of the underlying storage space. As a result, the traditional data migration techniques copy all content of the data to be migrated without taking account of the fact that some content data are redundant.

The technology disclosed herein utilizes the deduplication information while performing the data migration. If a data file shares a data block with another reference file, a source server sends the information of the block sharing to the destination server. Instead of sending the contents of the shared data block twice, the destination server can create the file by referencing the shared data block of the reference file. Therefore, the technology reduces the bandwidth needed for the data migration and preserves the storage efficiency at the destination.

System Environment

Figure 1:
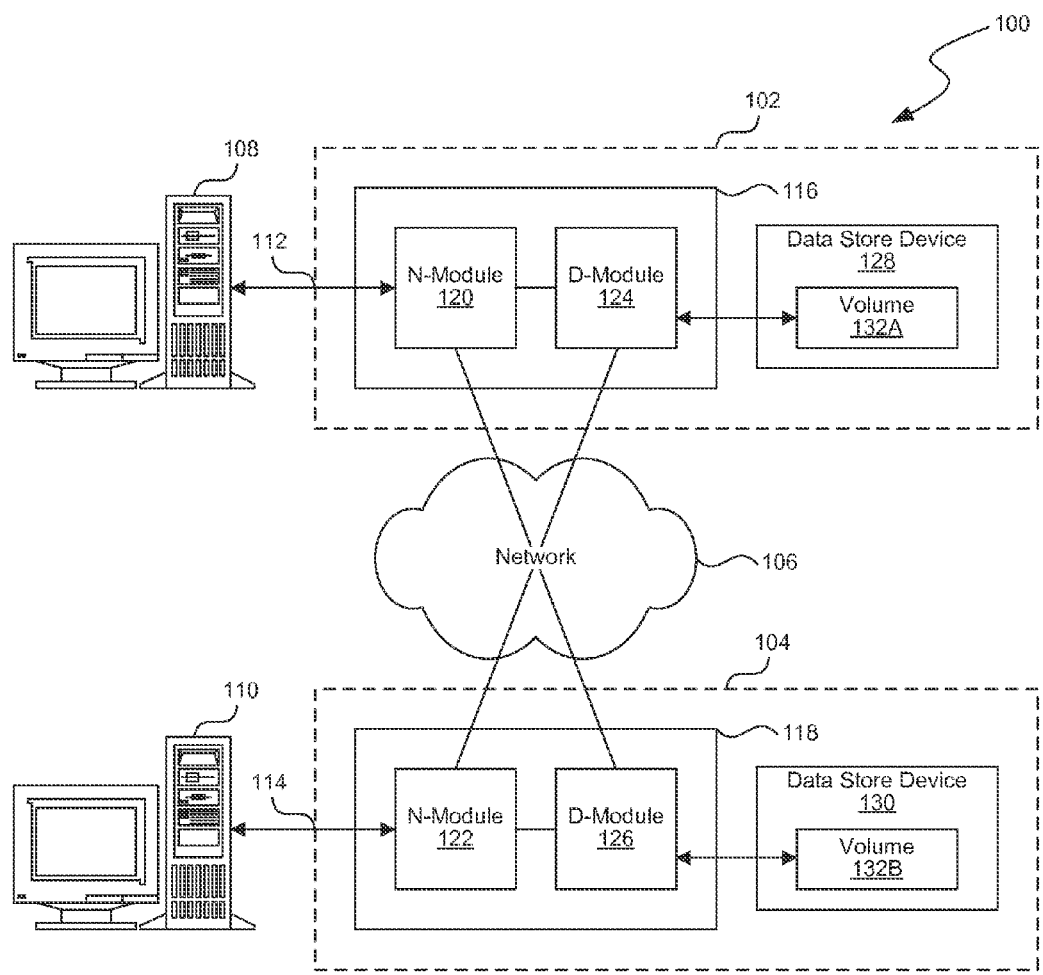
FIG. 1 is a block diagram illustrating a clustered network storage environment, in which the technology can operate in various embodiments.

Turning now to the figures, FIG. 1 is a block diagram illustrating a clustered network storage environment, in which the technology can operate in various embodiments. System 100 of FIG. 1 comprises data storage systems 102 and 104 that are coupled via network 106. For example, the data storage systems 102 and 104 can migrate data between each other via the network 106 (migrating can be, e.g., copying or moving). Data storage systems 102 and 104 can comprise one or more modules, components, etc., operable to provide operation as described herein. For example, data storage systems 102 and 104 can comprise nodes 116 and 118 and data storage devices 128 and 130, respectively. It should be appreciated that nodes and/or data storage devices of data storage systems 102 and 104 may themselves comprise one or more modules, components, etc. Nodes 116 and 118 comprise network modules (referred to herein as "N-Modules") 120 and 122 and data modules (referred to herein as "D-Modules") 124 and 126, respectively. Data storage devices 128 and 130 comprise volumes 132A and 132B of user and/or other data, respectively.

The modules, components, etc. of data storage systems 102 and 104 may comprise various configurations suitable for providing operation as described herein. For example, nodes 116 and 118 may comprise processor-based systems, e.g., file server systems, computer appliances, computer workstations, etc. Accordingly, nodes 116 and 118 of embodiments comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein.

Examples of data storage devices 128 and 130 are hard disk drives, solid state drives, flash memory cards, optical drives, etc., and/or other suitable computer readable storage media. Data modules 124 and 126 of nodes 116 and 118 may be adapted to communicate with data storage devices 128 and 130 according to a storage area network (SAN) protocol (e.g., small computer system interface (SCSI), fiber channel protocol (FCP), INFINIBAND, etc.) and thus data storage devices 128 and 130 may appear as locally attached resources to the operating system. That is, as seen from an operating system on nodes 116 and 118, data storage devices 128 and 130 may appear as locally attached to the operating system. In this manner, nodes 116 and 118 may access data blocks through the operating system, rather than expressly requesting abstract files.

Network modules 120 and 122 may be configured to allow nodes 116 and 118 to connect with client systems, such as clients 108 and 110 over network connections 112 and 114, to allow the clients to access data stored in data storage systems 102 and 104. Moreover, network modules 120 and 122 may provide connections with one or more other components of system 100, such as through network 106. For example, network module 120 of node 116 may access data storage device 130 via communication via network 106 and data module 126 of node, 118. The foregoing operation provides a distributed storage system configuration for system 100.

Clients 108 and 110 of embodiments comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein.

Network 106 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. Network 106, or a portion thereof may provide infrastructure of network connections 112 and 114 or, alternatively, network connections 112 and/or 114 may be provided by network infrastructure separate from network 106, wherein such separate network infrastructure may itself comprise a SAN, the Internet, the PSTN, a LAN, a MAN, a WAN, a wireless network, and/or the like.

As can be appreciated from the foregoing, system 100 provides a data storage system in which various digital data may be created, maintained, modified, accessed, and migrated (referred to collectively as data management). A logical mapping scheme providing logical data block mapping information, stored within and stored without the data structures, may be utilized by system 100 in providing such data management. For example, data files stored in the data storage device 128 can be migrated to the data storage device 130 through the network 106.

In some embodiments, data storage devices 128 and 130 comprise volumes (shown as volumes 132A and 132B respectively), which is an implementation of storage of information onto disk drives, disk arrays, and/or other data stores (e.g., flash memory) as a file-system for data, for example. Volumes can span a portion of a data store, a collection of data stores, or portions of data stores, for example, and typically define an overall logical arrangement of file storage on data store space in the storage system. In some embodiments, a volume can comprise stored data as one or more files that reside in a hierarchical directory structure within the volume.

Volumes are typically configured in formats that may be associated with particular storage systems, and respective volume formats typically comprise features that provide functionality to the volumes, such as providing ability for volumes to form clusters. For example, where a first storage system may utilize a first format for their volumes, a second storage system may utilize a second format for their volumes.

In the configuration illustrated in system 100, clients 108 and 110 can utilize data storage systems 102 and 104 to store and retrieve data from volumes 132. In such an embodiment, for example, client 108 can send data packets to N-module 120 in node 116 within data storage system 102. Node 116 can forward the data to data storage device 128 using D-module 124, where data storage device 128 comprises volume 132A. In this way, the client can access storage volume 132A, to store and/or retrieve data, using data storage system 102 connected by network connection 112. Further, in this embodiment, client 110 can exchange data with N-module 122 in node 118 within data storage system 104 (e.g., which may be remote from data storage system 102). Node 118 can forward the data to data storage device 130 using D-module 126, thereby accessing volume 132B associated with the data storage device 130.

The foregoing data storage devices each comprise a plurality of data blocks, according to embodiments herein, which may be used to provide various logical and/or physical storage containers, such as files, container files holding volumes, aggregates, virtual disks, etc. Such logical and physical storage containers may be defined using an array of blocks indexed or mapped either logically or physically by the file system using the appropriate type of block number. For example, a file may be indexed by file block numbers (FBNs), a container file by virtual block numbers (VBNs), an aggregate by physical block numbers (PBNs), and disks by disk block numbers (DBNs). To translate an FBN to a disk block, a file system may use several steps, such as to translate the FBN to a VBN, to translate the VBN to a PBN, and then to translate the PBN to a DBN. Storage containers of various attributes may be defined and utilized using such logical and physical mapping techniques. For example, volumes such as volumes 132A and 132B may be defined to comprise aggregates (e.g., a traditional volume) and/or flexible volumes (e.g., volumes built on top of traditional volumes as a form of virtualization) using such logical and physical data block mapping techniques.

Figure 2:
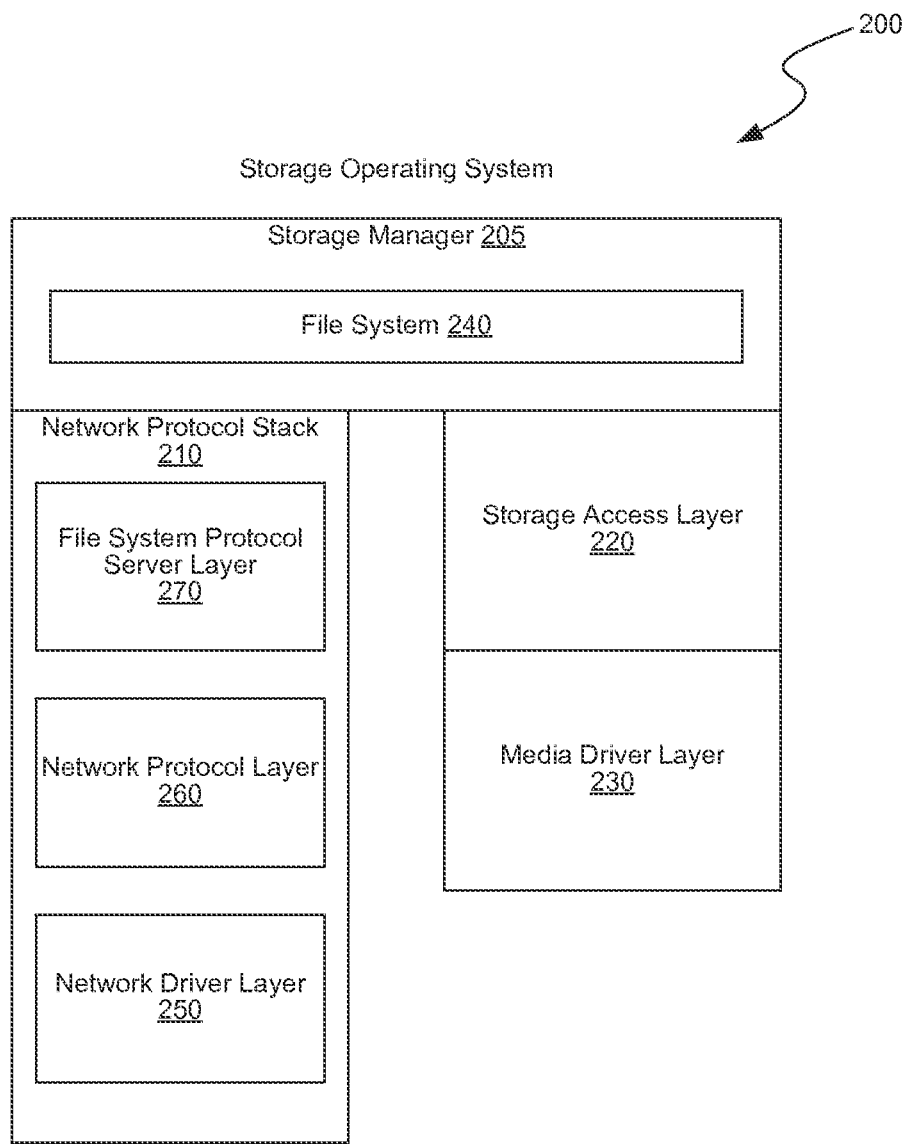
FIG. 2 is a block diagram of a storage operating system, according to various embodiments.

FIG. 2 is a block diagram of a storage operating system, according to various embodiments. As used herein, the term "storage operating system" generally refers to the computer-executable code operable on a computer or a computer cluster to perform a storage function that manages data access and other related functions. Storage operating system 200, can be implemented as a microkernel, an application program operating over a general-purpose operating system, or as a general-purpose operating system configured for the storage applications as described herein. In the illustrated embodiment, the storage operating system 200 includes a network protocol stack 210 having a series of software layers including a network driver layer 250 (e.g., an Ethernet driver), a network protocol layer 260 (e.g., an Internet Protocol layer and its supporting transport mechanisms: the TCP layer and the User Datagram Protocol layer), and a file system protocol server layer 270 (e.g., a CIFS server, a NFS server, etc.). In addition, the storage operating system 200 includes a storage access layer 220 that implements a storage media protocol such as a RAID protocol, and a media driver layer 230 that implements a storage media access protocol such as, for example, a Small Computer Systems Interface (SCSI) protocol. Any and all of the modules of FIG. 2 can be implemented as a separate hardware component. For example, the storage access layer 220 may alternatively be implemented as a parity protection RAID module and embodied as a separate hardware component such as a RAID controller. Bridging the storage media software layers with the network and file system protocol layers is the storage manager 205 that implements one or more file system(s) 240.

Data can be structured and organized by a storage server or a storage cluster in various ways. In at least one embodiment, data is stored in the form of volumes, where each volume contains one or more directories, subdirectories, and/or files. The term "aggregate" is used to refer to a pool of physical storage, which combines one or more physical mass storage devices (e.g., magnetic disk drives or solid state drives) or parts thereof, into a single storage object. An aggregate also contains or provides storage for one or more other data sets at a higher-level of abstraction, such as volumes. A "volume" is a set of stored data associated with a collection of mass storage devices, such as disks, which obtains its storage from (i.e., is contained within) an aggregate, and which is managed as an independent administrative unit, such as a complete file system. A volume includes one or more file systems, such as an active file system and, optionally, one or more persistent point-in-time images of the active file system captured at various instances in time. As stated above, a "file system" is an independently managed, self-contained, organized structure of data units (e.g., files, blocks, or logical unit numbers (LUNs)). Although a volume or file system (as those terms are used herein) may store data in the form of files, this is not necessarily the case. That is, a volume or file system may store data in the form of other units of data, such as blocks or LUNs. Thus, although the discussion herein uses the term "file" for convenience, one skilled in the art will appreciate that the system can be used with any type of data object that can be migrated. In some embodiments, the storage server uses one or more volume block numbers (VBNs) to define the location in storage for blocks stored by the system. In general, a VBN provides an address of a block in a volume or aggregate. The storage manager 205 tracks information for all of the VBNs in each data storage system.

In some embodiments, each file is represented in the storage server in the form of a hierarchical structure called a "buffer tree." As used herein, the term buffer tree is defined as a hierarchical metadata structure containing references (or pointers) to logical blocks of data in the file system. A buffer tree is a hierarchical structure which can be used to store file data as well as metadata about a file, including pointers for use in locating the data blocks for the file.

Figure 3A:
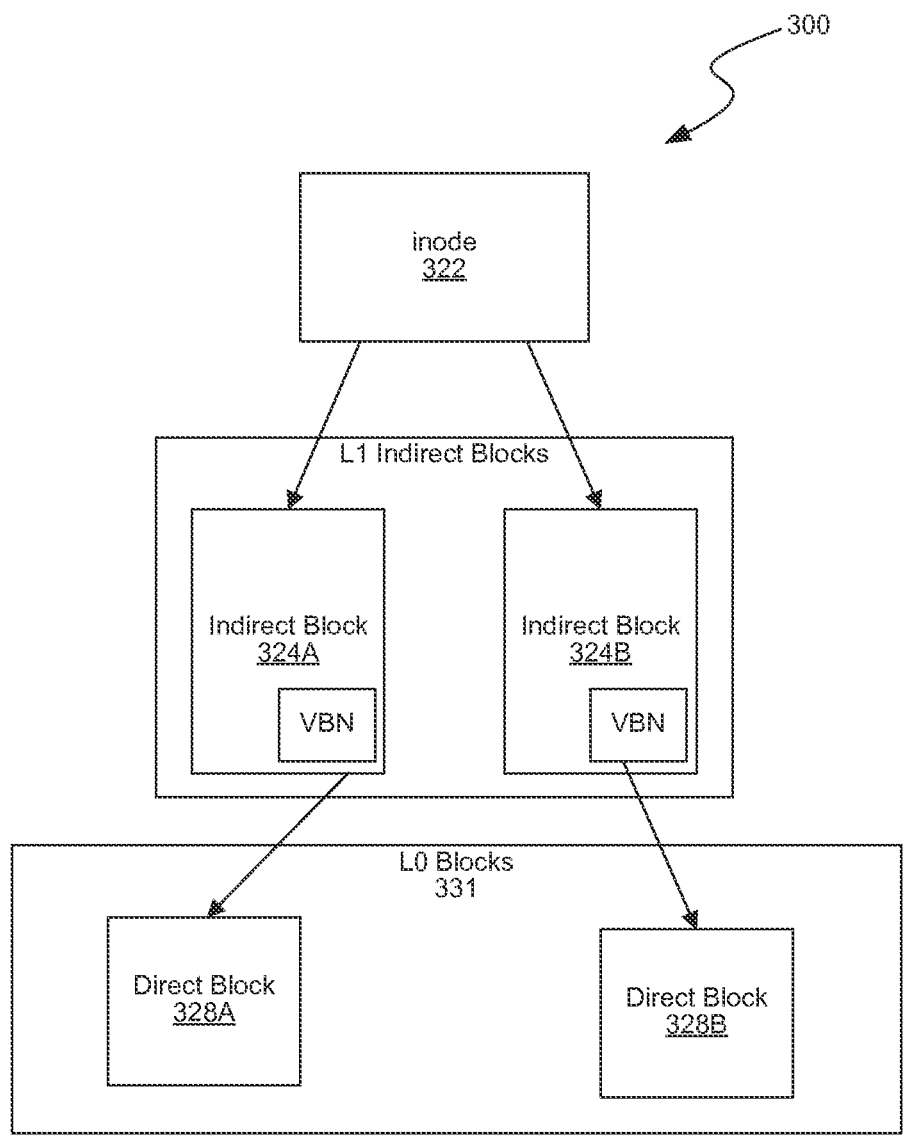
FIG. 3A is a block diagram of a buffer tree of a file, in various embodiments.

FIG. 3A is a block diagram of a buffer tree of a file, in various embodiments. A file is assigned to an inode 322, which references Level 1 (L1) indirect blocks 324A and 324B. Each indirect block 324 stores at least one volume block number (VBN) that references a direct (L0) block stored on the storage subsystem 110. To simplify description, only one VBN is shown in each indirect block 324 in FIG. 3A; however, an actual implementation would likely include multiple/many VBNs in each indirect block 324. Each VBN references a direct block 328A and 328B, respectively, in the storage device.

As illustrated in FIG. 3A, a buffer tree includes one or more levels of indirect blocks (called "L1 blocks", "L2 blocks", etc.), each of which contains one or more pointers to lower-level indirect blocks and/or to the direct blocks (called "L0 blocks" or "data blocks") of the file. All of the data in the file is stored only at the lowest level (L0) blocks. The root of a buffer tree is stored in the "inode" of the file. As noted above, an inode is a metadata container that is used to store metadata about the file, such as ownership, access permissions, file size, file type, and pointers to the highest-level of indirect blocks for the file. Each file has its own inode. The inode is stored in a separate inode container, which may itself be structured as a buffer tree. The inode container may be, for example, an inode file. In hierarchical (or nested) directory file systems, subdirectories are nested within higher-level directories and entries of the directories point to files, which also have their own buffer trees of indirect and direct blocks. Directory entries include the name of a file in the file system, and directories are said to point to (reference) that file. Alternatively, a directory entry can point to another directory in the file system. In such a case, the directory with the entry is said to be the "parent directory," while the directory that is referenced by the directory entry is said to be the "child directory" or "subdirectory."

It should be appreciated that the hierarchical logical mapping of a buffer tree can provide indirect data block mapping using multiple levels (shown as levels L0-L2). Data blocks of level L0 comprise the actual data (e.g., user data, application data, etc.) and thus provide a data level. Levels L1 and L2 of a buffer tree can comprise indirect blocks that provide information with respect to other data blocks, wherein data blocks of level L2 provide information identifying data blocks of level L1 and data blocks of level L1 provide information identifying data blocks of level L0. The buffer tree can comprise a configuration in which data blocks of the indirect levels (levels L1 and L2) comprise both logical data block identification information (shown as virtual block numbers (VBNs)) and their corresponding physical data block identification information (shown as physical block numbers (PBNs)). That is, each of levels L2 and L1 has both a VBN and PBN. This format, referred to as dual indirects due to there being dual block numbers in indirect blocks, is a performance optimization implemented according to embodiments herein.

Alternative embodiments may be provided in which the file buffer trees store VBNs without their corresponding PBNs. For every VBN, the system would look up the PBN in another map (e.g., a container map).

In addition, data within the storage server can be managed at a logical block level. At the logical block level, the storage manager maintains a logical block number (LBN) for each data block. If the storage server stores data in the form of files, the LBNs are called file block numbers (FBNs). Each FBN indicates the logical position of the block within a file, relative to other blocks in the file, i.e., the offset of the block within the file. For example, FBN 0 represents the first logical block in a particular file, while FBN 1 represents the second logical block in the file, and so forth. Note that the VBN of a data block is independent of the FBN(s) that refer to that block.

Figure 3B:
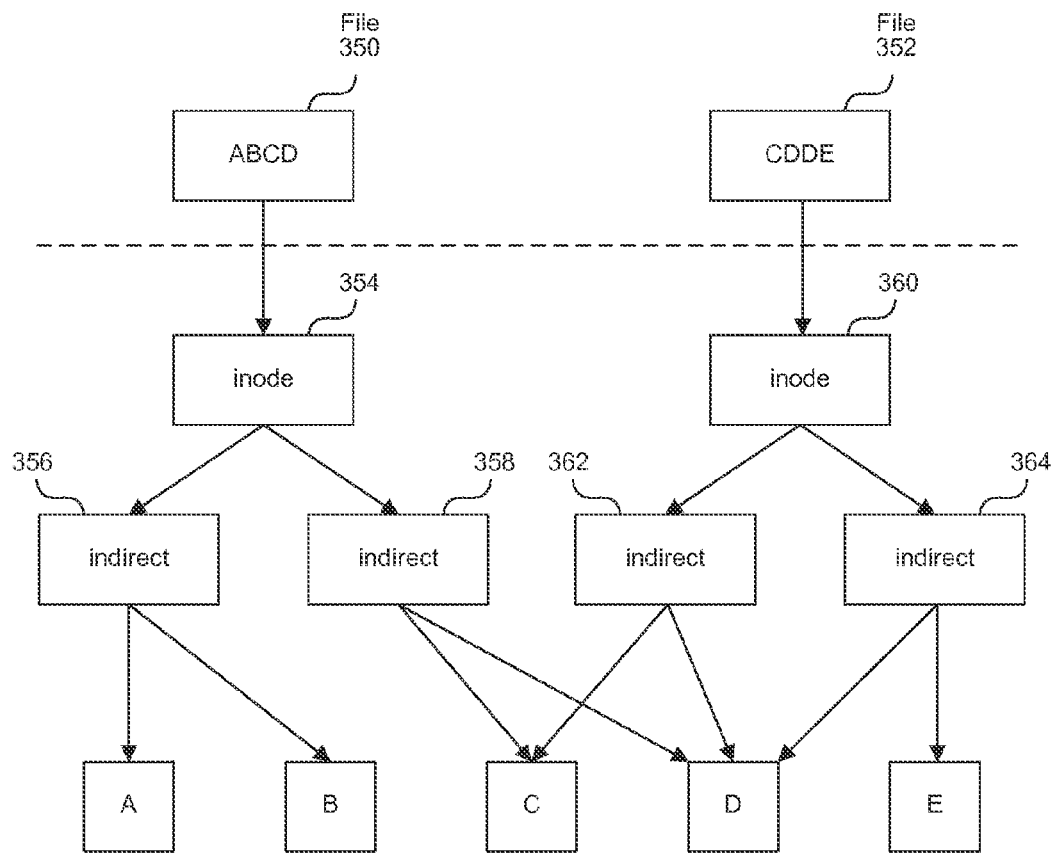
FIG. 3B is a block diagram illustrating an example of data block sharing between two files.

In some embodiments, file systems can share data blocks among multiple inodes to more efficiently use space in the storage system, e.g., to avoid unnecessary block duplication. FIG. 3B is a block diagram illustrating an example of data block sharing between two files. The two inodes correspond to files 350 and 352. The file 350 includes data blocks A, B, C, D, whereas file 352 includes data blocks C, D, D, E. The file 350 is represented by a first inode 354, which includes indirect blocks 356 and 358. The file 352 is represented by a second inode 360, which includes indirect blocks 362 and 364. As shown in the figure, indirect block 356 includes references to data blocks A and B, whereas indirect block 358 includes references to data blocks C and D. Similarly, indirect block 362 includes references to data blocks C and D, whereas indirect block 364 includes references to data blocks D and E. By sharing references to data blocks, the system reduces the amount of space consumed by the files 350 and 352.

In some embodiments, the file system can maintain a block reference count, which tracks the number of indirect blocks that reference each data block. When only a single indirect block references a data block (e.g., data blocks A, B, and E), the system stores a zero value for the data block's reference count. When a data block is referenced by two data blocks (e.g., data block C), the reference count is incremented to one, indicating that one additional block references the data block. Similarly, data block D is referenced by two additional indirect blocks, so the block reference table stores a value of two. As indirect blocks release their references to an individual data block, the system decrements the reference count. The system can then free a data block if the data block is no longer referenced by any indirect blocks.

Preserving Storage Efficiency

Figure 4:
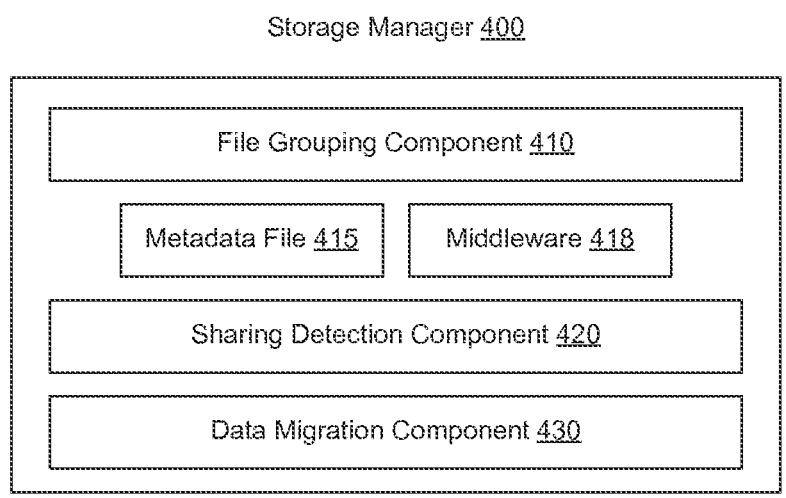
FIG. 4 is a block diagram illustrating an example of a storage manager for migrating data and preserving storage efficiency information, in various embodiments.

FIG. 4 is a block diagram illustrating an example of a storage manager for migrating data and preserving storage efficiency information, in various embodiments. The storage manager 400 can be, e.g., a component within a storage operating system (e.g., the storage manager 205 as illustrated in FIG. 2). The storage manager 400 is capable of migrating data files between storage systems and preserving the storage efficiency during the data migration. The storage efficiency includes, e.g., the data deduplication. Since the storage manager 400 has the knowledge of the data blocks that are shared between files in the system, the storage manger 400 can avoid transferring these shared data blocks more than once to a destination system. Instead, the storage manager 400 can indicate that these data blocks are shared and provide information to the destination system so that the destination system can form the data files using data blocks that have already been transferred to the destination system.

The storage manager 400 can include multiple components to provide various functionalities. For example, the storage manager 400 can include a file grouping component 410. The file grouping component 410 is configured to determine at least one group of two or more files that likely or actually share common data blocks. The determination can be made in different ways. In some embodiments, the file grouping component 410 can generate an inquiry to an administrator of the storage manager for manually determining the file group. The administrator can manually instruct the file grouping component 410 to identify the file group based on his or her knowledge of the files.

For example, a data storage system of the storage manager 400 can be used to store file system images for virtual machines. The data storage system can further make point-in-time backups of these virtual machine file system images (also referred to as clones). The images and their clones can share common data blocks. With the knowledge of these backup and deduplication operations, the administrator of the storage manager 400 can manually instruct the file grouping component 410 to identify a file group including a virtual machine file system image and its clone(s).

In some embodiments, the file grouping component 410 can automatically determine the file group. The file grouping component 410 can maintain a metafile 415 that includes metadata regarding the relationships between the files. For example, the metafile 415 can include information indicating that a virtual machine file system image file is the parent of a backup file, because the backup file is created as a clone of that virtual machine file system image. Using the information of the relationships between the files, the file group component can automatically determine a file group by identifying files that have parent-child relationships based on the metafile 415.

In some embodiments, the file grouping component 410 can include a middleware 418. The middleware 418 monitors file system requests from the administrator to the data storage system, as well as file system requests from outside clients to the data storage system. If there is a file system request from the administrator or an outside client to replicate a data file, the middleware 418 receives the information regarding the relationship between the original file and the replicated file. The middleware 418 can even actively seek candidates of related files by calculating differences between files. If the calculated difference is lower than a threshold value, the middleware 418 can record these two files as related.

After the file grouping component 410 identifies a group of files that share one or more common data blocks, the file grouping component 410 can further select a file among the identified group of files as a reference file. The reference file serves as a reference of the commonly shared data blocks. Other files (also referred to as selected files or incremental files) in the group can reference the shared data blocks by referring to the blocks of the reference file.

The reference file can be selected in various ways. For example, the file grouping component 410 can select a newest file or an oldest file as the reference file. Alternatively, the file grouping component 410 can select the largest file within the group as the reference file.

In some embodiments, the group of files can have more than one reference files. For example, a first file in the group can be a reference file for a second file in the group; the second file can be a reference file for a third file in the group; the third file can be a reference file for a fourth file in the group; etc. In other words, the group of files can include a chain of reference files.

The storage manager 400 can include a sharing detection component 420. The sharing detection component 420 is responsible for detecting whether any data blocks are shared between a reference file and another selected file in the group. To detect the sharing, the sharing detection component 420 compares on-disk locations of data blocks of the reference file with on-disk locations of data blocks of the selected file.

For example, the sharing detection component 420 can scan a buffer tree of the reference file (e.g., a buffer tree as illustrated in FIG. 3A or FIG. 3B) to identify all VBNs of the data blocks of the reference file. Similarly, the sharing detection component 420 scans a buffer tree of the selected file to identify all VBNs of the data blocks of the selected file. These VBNs represents the on-disk locations of the data blocks of the reference file and the selected file. The sharing detection component 420 compares the VBNs of the reference files and the VBNs of the selected files.

If there is a VBN representing an on-disk location of a data block of the reference file, where the same VBN represents an on-disk location of a data block of the selected file, the reference file and the selected file share the data block stored at the on-disk location represented by that VBN. The sharing detection component 420 will then record two file block numbers (FBNs) for identifying the shared data block. A first FBN represents an offset location of the shared data block in the reference file; a second FBN represents an offset location of the shared data block in the selected file. The sharing detection component 420 uses these two FBNs to identify the shared data block. In other words, the selected file includes a data block at the second FBN (i.e., offset within the selected file). This data block is the same data block included in the reference file at the first FBN (i.e., offset within the reference file).

The storage manager 400 can include a data migration component 430. The data migration component 430 generates information to be sent to a destination data storage system. For example, the data migration component 430 can generate a bitmap for a selected file within the group. The bits of the bitmap correspond to the data blocks of the selected file. The bits represent FBNs that identify data blocks in the selected file. For example, the first bit of the bitmap corresponds to the first data block in the selected file (FBN 0), the second bit of the bitmap corresponds to the second data block in the selected file (FBN 1), etc. In some alternative embodiments, the bitmap includes a header section for storing housekeeping information such as file size and last file modified date. In that case, the rest of the bitmap after the header section corresponds to the data blocks of the selected file.

The value of a bit in the bitmap indicates whether the corresponding data block is shared between the selected file and the reference file. Depending on the negotiated protocol, the value of the bit can be one if the corresponding data block is shared, while the bit is zero if the corresponding data block is not shared, or vice versa.

Other than, or in addition to the bitmap, the data migration component 430 can further generate a shared block FBN sequence including FBNs of the shared data blocks in the reference file. The order of the FBNs in the sequence can, e.g., follow the shared data blocks' locations in the selected file. For example, the selected file and the reference file can share two data blocks A and B. The selected file includes the data block A at FBN 2 and the data block B at FBN 10 within the selected file. The data migration component 430 generates a bitmap of the selected file. In some embodiments, the second and the tenth bits of the bitmap indicate shared data blocks. The reference file includes the data block B at FBN 3 and the data block A at FBN 7 within the reference file. The data migration component 430 generates a shared block FBN sequence for the selected file including FBN 7 and then FBN 3. Note that the order of the sequence follows the order of blocks A and B located in the selected file, instead of the reference file. In alternative embodiments, the order of the FBNs in the sequence can follow other orders as an ordinary skilled person can appreciate.

The data migration component 430 sends contents of the reference file to a destination data storage system. Then the data migration component 430 sends the bitmap for the selected file and the shared block FBN sequence for the selected file to the destination data storage system. The destination data storage system creates a copy of the selected file based on the received bitmap and shared block FBN sequence. The destination data storage system identifies the shared data blocks within the selected file based on the bitmap. The destination data storage system does not necessarily allocate new storage space for these shared data blocks. Instead, the destination data storage system examines the received shared block FBN sequence to identify the file offset FBNs of the shared data blocks within the reference file. Because the destination data storage system has already received the contents of the reference file and allocated storage space for the data blocks of the reference file, the destination data storage system can create a buffer tree of the selected file that points to the shared data blocks of the reference file.

The selected file may include data blocks that are not shared with the reference file (e.g., unshared data blocks). The data migration component 430 can further send the contents of the unshared data blocks to the destination data storage system. The data storage system allocates storage space for the unshared data blocks and stores the contents to the allocated storage space.

In some embodiments, the data migration component 430 does not necessarily send the contents of the unshared data blocks to the destination data storage system immediately after sending the bitmap and shared block FBN sequence. The data migration component 430 can wait and send the contents of the unshared data blocks when the destination data storage system actually needs the contents for fulfilling a file access request. In other words, the destination data storage system may create the selected file without actually allocating storage space for the unshared data blocks. When the destination data storage system receives a request to access the data of the unshared data blocks, the destination data storage system then retrieves the contents and allocates the storage space for storing the contents of the unshared data blocks.

Figure 5:
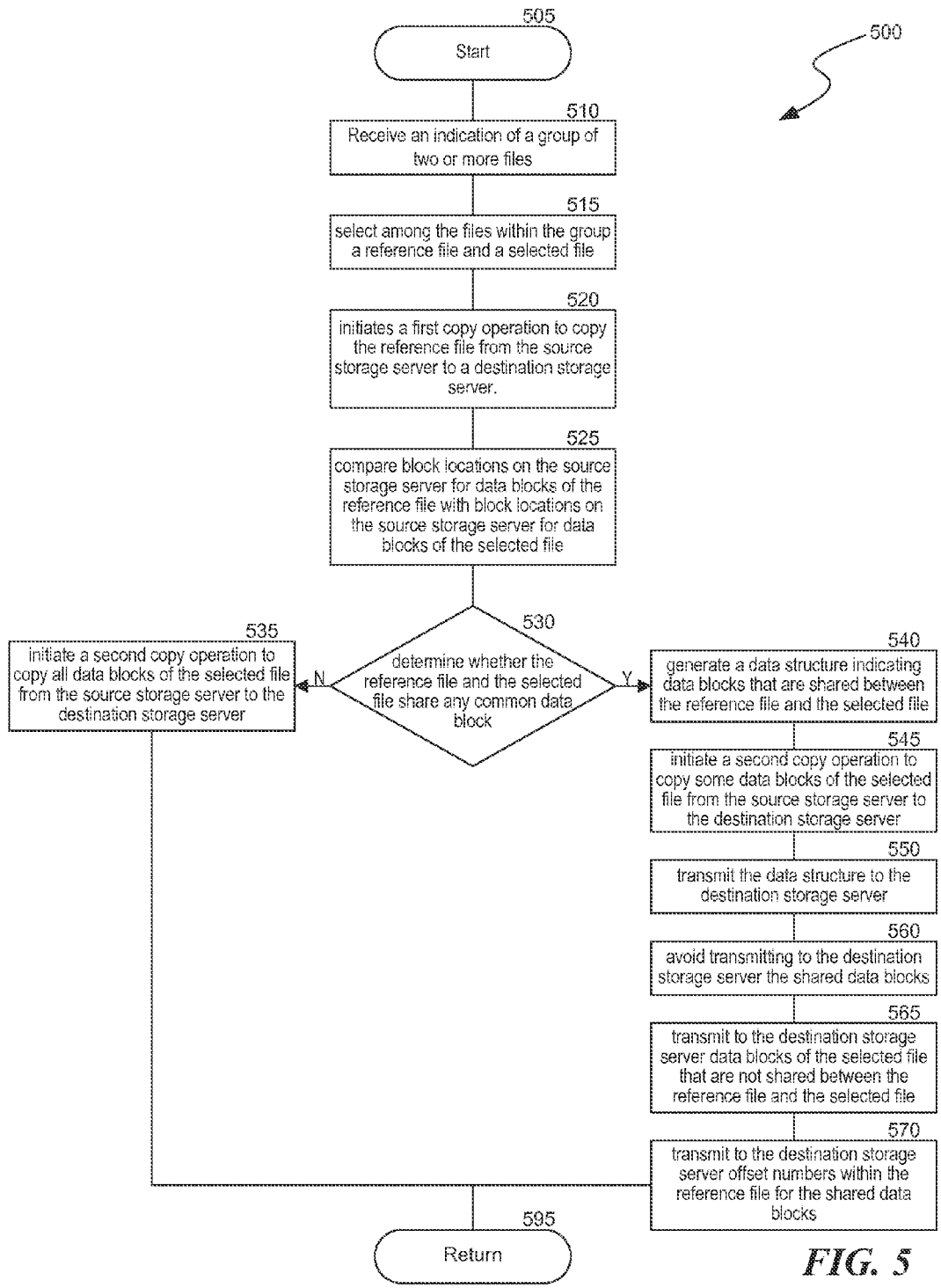
FIG. 5 is a flow diagram illustrating a process for migrating data and preserving storage efficiency information, in various embodiments.

FIG. 5 is a flow diagram illustrating a process for migrating data and preserving storage efficiency information, in various embodiments. The process 500 starts at 505. At block 510 of the process 500, a source storage server receives an indication of a group of two or more files. The source storage server stores the files within the groups. At least two files within the group share one or more common data blocks.

The source storage server can determine the files within the group in various ways. For example, an administrator or operator of the source storage server can manually identify files that belong to a single group. The source storage server can, e.g., store file system images for virtual machines. The source storage server may also store point-in-time backups of particular virtual machines. A file system image of a virtual machine can contain data blocks that are shared by a previous file system image of the same virtual machine, except certain blocks that are changed since the previous file system image was created. The administrator of the source storage server can identify the file system images for a particular virtual machine. Since these file system images or files likely share data blocks among each other, the administrator can manually specify a group consisting of these file system images.

Alternatively, the source storage server can rely on programs to determine the relationship of the files. For example, the source storage server can include a program that clones file system images. The cloning program may maintain a metafile which indicates the relationships of the image files. If the cloning program makes a clone of an origin file, the metafile will record the information identifying the original file and the derivative file. By examining the metafile, the source storage server can identify multiple file that have significant overlap in terms of contents.

In some other embodiments, the source storage server can also include a middleware that monitors the creation of the files. For example, if a first file is created as a clone of a second file, the middleware records the information of the cloning relationship between the first and second files. The middleware can also, e.g., record information regarding creation of file system images for a particular virtual machine. The metadata maintained by the middleware indicates that the file system images are for the same virtual machine and likely share multiple data blocks.

At block 515 of the process 500, the source storage server selects among the files within the group a reference file and a selected file (also referred to as incremental file). The reference file and the selected file may share at least one common data block stored in the source storage server. The source storage server can select the reference file in various ways. For example, the source storage server can select the most recent file, or the oldest file, within the group as the reference file. Alternatively, the source storage server can select a reference file based on the way that the application generates the files.

In some alternative embodiments, the source storage server can select multiple reference files and multiple selected files among the files within the group. For example, a first file can be designated as a reference file of a second file, the second file can be designated as a reference file of a third file, etc. As another example, every file in a group, except the reference file, can be treated as a selected file. In cases where the group includes multiple selected files, processing for each of the selected files may be performed in parallel. In other words, the processing tasks for the selected files can be performed simultaneously.

At block 520, the source storage server initiates a first copy operation to copy the reference file from the source storage server to a destination storage server. The data blocks of the reference file are transferred from the source storage server to the destination storage server.

At block 525, the source storage server compares block locations on the source storage server for data blocks of the reference file with block locations on the source storage server for data blocks of the selected file. In some embodiments, the block locations on the source storage server are represented by volume block numbers (VBNs). If the reference file has a data block with a VBN that is the same as the VBN of a data block of the selected file, the reference file and the selected file are identified as sharing a common data block represented by the VBN.

Alternatively, in order to determine whether the reference file shares any common data blocks with the selected file, the source storage server directly compares the checksums, cryptographic hashes, or data contents of the data blocks of the reference file with the checksums, cryptographic hashes, or data contents of the data blocks of the selected file.

At decision block 530, the source storage server determines whether the reference file and the selected file share any common data blocks. If the reference file and the selected file do not share any common data blocks, at block 535, the source storage server initiates a second copy operation to copy all data blocks of the selected file from the source storage server to the destination storage server.

If the reference file and the selected file do share at least one common data block, at block 540, the source storage server generates a data structure indicating data blocks that are shared between the reference file and the selected file. In some embodiments, the data structure includes the VBNs of the shared data blocks. The data structure can also include the offset locations within the reference file and the selected file for the shared data blocks. The offset locations within the files can be represented by, e.g., file block numbers (FBNs).

Alternatively the data structure can be or can include a bitmap including bits that correspond to data blocks of the selected file, the bits indicating whether the corresponding data blocks are shared between the selected file and the reference file. The bits within the bit map correspond to the data blocks of the selected file. The relative position of the bits within the bitmap corresponds to the relative offsets of data blocks within the file. The values of the bits indicate whether the corresponding data blocks are shared with the reference file. For example, if a bit has a value of zero, a data block corresponding to that data is not shared with the reference file; if the bit has a value of one, the data block corresponding to the bit is shared with the reference file. The shared data blocks of the reference file can be located based on their file block numbers within the reference file.

Continuing at block 545, the source storage server initiates a second copy operation to copy some data blocks of the selected file from the source storage server to the destination storage server. At block 550, the source storage server transmits the data structure to the destination storage server.

At block 560, the source storage server avoids transmitting to the destination storage server the shared data blocks. At block 565, the source storage server transmits to the destination storage server data blocks of the selected file that are not shared between the reference file and the selected file. At block 570, the source storage server may further transmit to the destination storage server offset numbers within the reference file (e.g., FBNs) for the shared data blocks. At block 595, the process 500 returns.

Those skilled in the art will appreciate that the logic illustrated in FIG. 5 and described above, and in each of the flow diagrams discussed below, may be altered in a variety of ways. For example, the order of the logic may be rearranged, substeps may be performed in parallel, illustrated logic may be omitted, other logic may be included, etc. For example, the step of initiating the first copy operation at block 520 can be performed before, during, or after the steps at blocks 525-550.

The source storage server can determine whether a reference file and a selected file share data blocks by examining metadata of the files. For example, the source storage server can scan the buffer trees of the reference and the selected file. The buffer trees contain volume block numbers that point to the actual storage locations of the data blocks. If the buffer trees of two separate files contain the same volume block number, these two files share a common data block represented by that volume block number. The source storage server needs not scan the actual content of the data blocks in order to determine the block sharing between two files.

Figure 6:
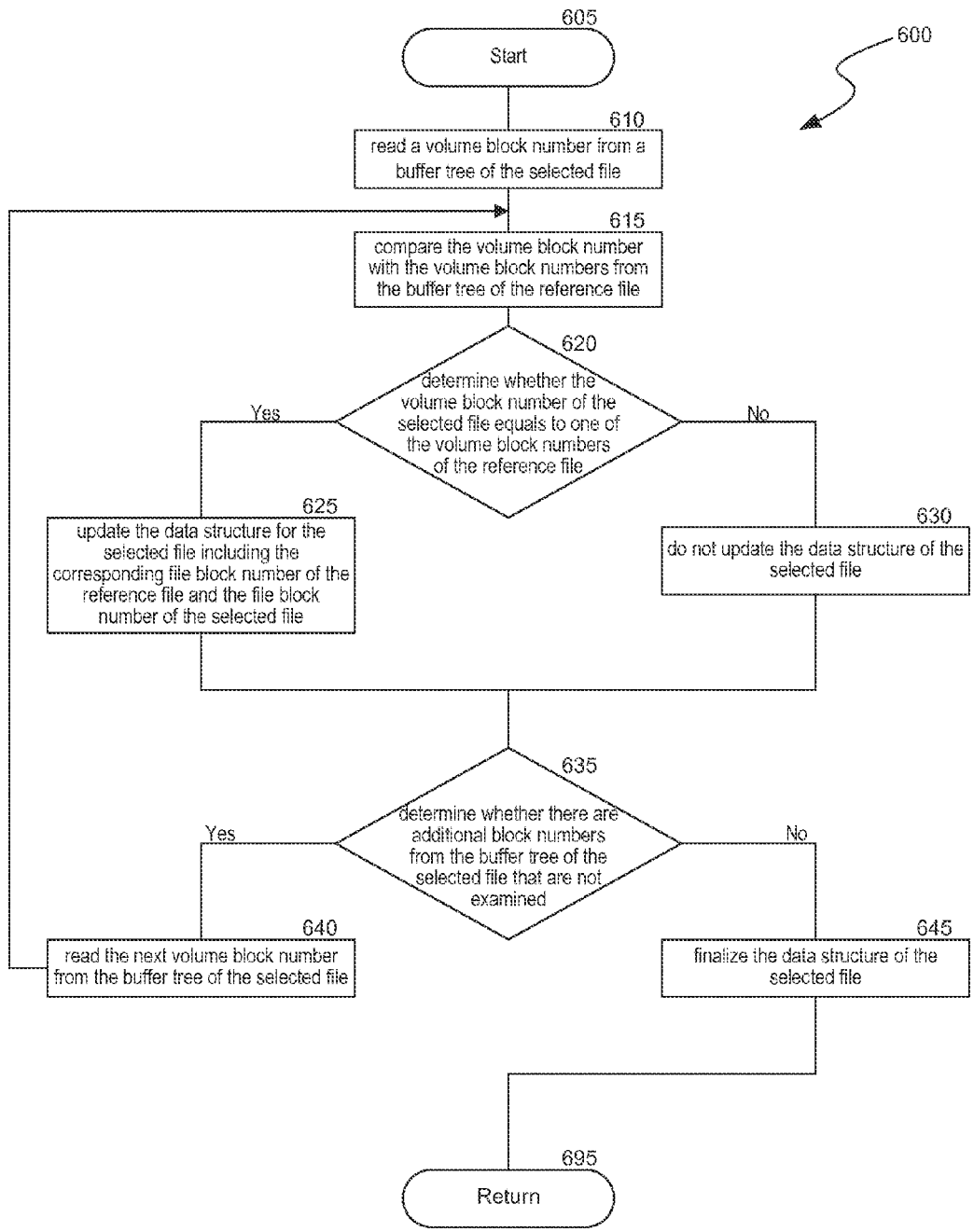
FIG. 6 is a flow diagram illustrating a process for identifying data blocks that are shared between a reference file and a selected file, in various embodiments.

FIG. 6 is a flow diagram illustrating a process for identifying data blocks that are shared between a reference file and a selected file, in various embodiments. The process starts at block 605. At block 610, the source storage server reads a volume block number from a buffer tree of the selected file. At block 615, the source storage server compares the volume block number with the volume block numbers from the buffer tree of the reference file.

At decision block 620, the source storage server determines whether the volume block number of the selected file equals one of the volume block numbers of the reference file. If there is some volume block number of the reference file that matches the volume block number of the selected file, at block 625, the source storage server updates the data structure for the selected file including the corresponding file block number of the reference file and the file block number of the selected file. The file block number indicates the relative offset position of the block in a particular file.

For example, if the data structure of the selected file includes a file block number 10 of the reference file and file block number 17 of the selected file, the data block at offset position 17 of the selected file shares the actual data block at the offset position 10 of the reference file. If there is no matched volume block number, at block 630, the source storage server does not update the data structure of the selected file.

Subsequently, at decision block 635, the source storage server determines whether there are additional block numbers from the buffer tree of the selected file that are not examined. If there are still unexamined volume block numbers from the selected file, the process continues to block 640 to read the next volume block number from the buffer tree of the selected file and then to repeat the process at block 615. If all volume block numbers from the buffer tree of the selected file have been examined, the source storage server finalizes the data structure of the selected file at block 645. At block 695, the process 600 returns.

Figure 7A:
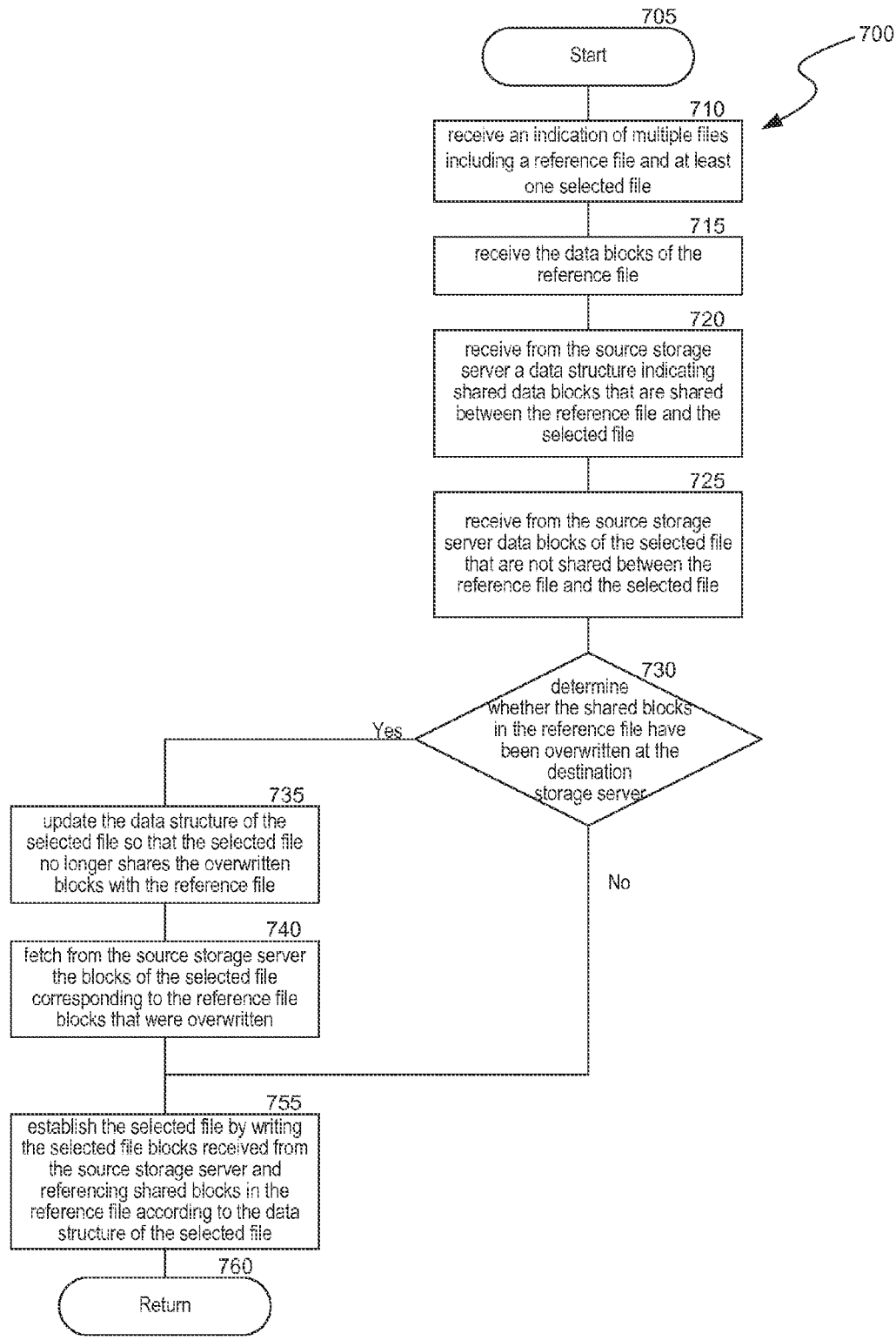
FIG. 7A is a flow diagram illustrating a process for reconstructing files at the destination storage server, in various embodiments.

The destination storage server uses the data blocks of the reference file and the data structure of the selected file to reconstruct the selected file on the destination storage server. FIG. 7A is a flow diagram illustrating a process for reconstructing files at the destination storage server, in various embodiments. The process 700 starts at block 705. At block 710, the destination storage server receives an indication of multiple files including a reference file and at least one selected file. At block 715, the destination storage server receives the data blocks of the reference file. At block 720, the destination storage server receives from the source storage server a data structure indicating shared data blocks that are shared between the reference file and the selected file. The data structure can include, for example, a bitmap identifying the shared data blocks and corresponding file block numbers of the shared data blocks within the reference file.

At block 725, the destination storage server receives from the source storage server data blocks of the selected file that are not shared between the reference file and the selected file. In some alternative embodiments, the destination storage server can create the selected file using absent allocation operations (discussed later), even before receiving the unshared data blocks.

Once the reference file has been received at the destination storage server, a client of the destination storage server can access the reference file or even modify the reference file. If a shared data block of the reference file is modified, the modified data block no longer shares the same content as the corresponding data block(s) of the selected file. The destination storage server will no longer use that modified data block to reconstruct the selected file. The destination storage server can, e.g., determine whether a data block of the reference file has been modified since the reference file was retrieved, by examining the file system metadata of the reference file.

At block 730, the destination storage server determines whether the shared blocks in the reference file have been overwritten at the destination storage server. If not, the process continues to block 755. Otherwise the process continues to block 735, where the destination storage server updates the data structure of the selected file so that the selected file no longer shares the overwritten blocks with the reference file.

At block 740, the destination storage server fetches from the source storage server the blocks of the selected file corresponding to the reference file blocks that were overwritten.

At block 755, the destination storage server establishes the selected file by writing the selected file blocks received from the source storage server and referencing shared blocks in the reference file according to the data structure of the selected file. At block 760, the process 700 returns.

Figure 7B:
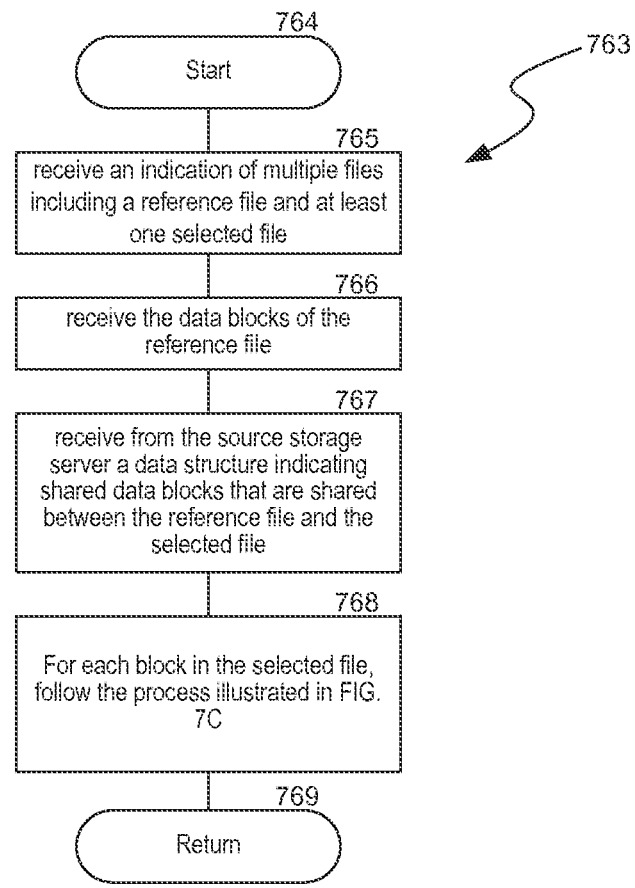
FIG. 7B is a flow diagram illustrating an alternative process for reconstructing files at the destination storage server, in various embodiments.

FIG. 7B is a flow diagram illustrating an alternative process for reconstructing files at the destination storage server, in various embodiments. The process 763 starts at block 764. At block 765, the destination storage server receives an indication of multiple files including a reference file and at least one selected file. At block 766, the destination storage server receives the data blocks of the reference file. At block 767, the destination storage server receives from the source storage server a data structure indicating shared data blocks that are shared between the reference file and the selected file. The data structure can include, for example, a bitmap identifying the shared data blocks and corresponding file block numbers of the shared data blocks within the reference file.

Figure 7C:
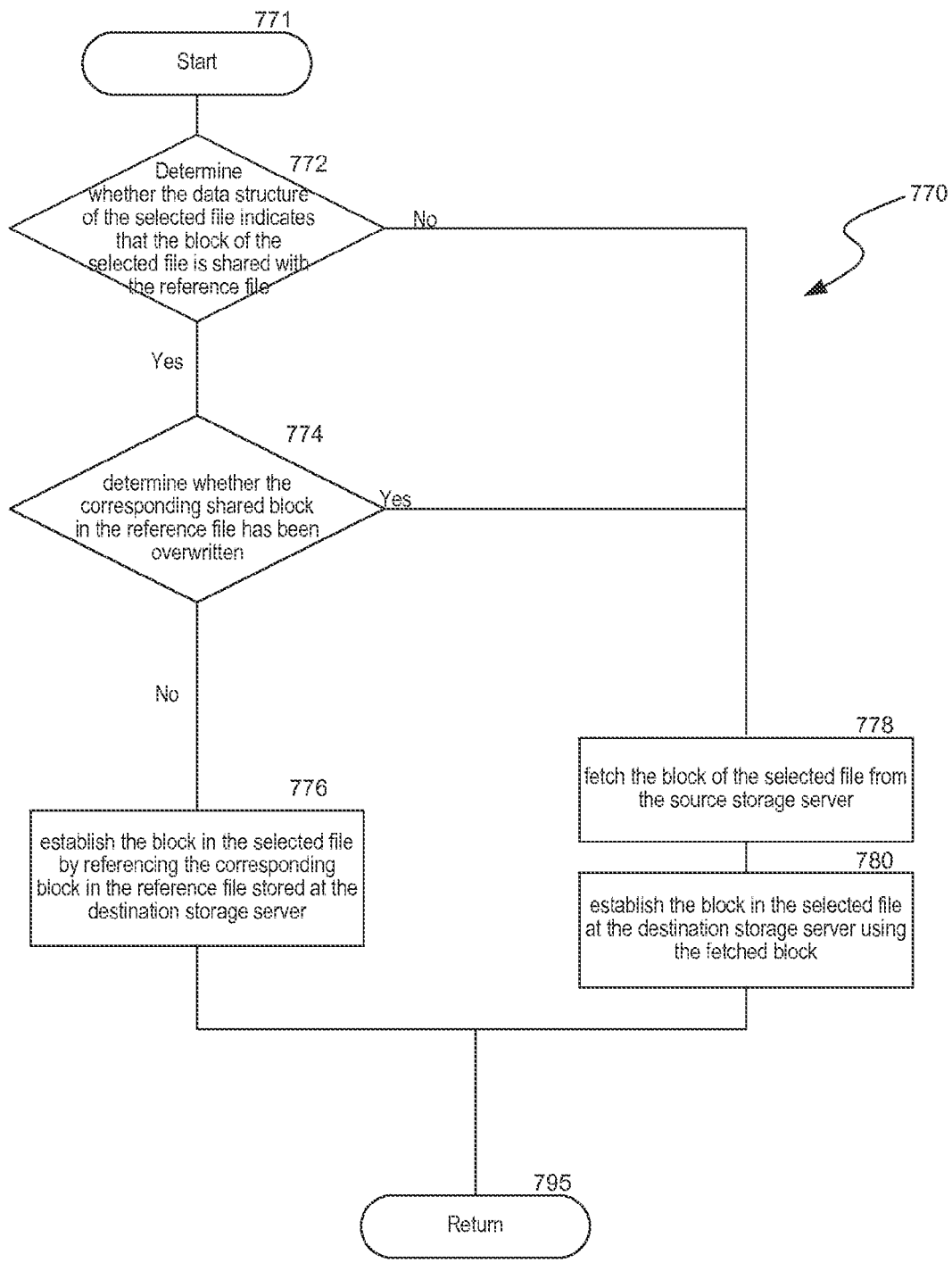
FIG. 7C is a flow diagram illustrating a process for establishing data blocks of a selected file at the destination storage server, in various embodiments.

At block 768, for each block in the selected file, the destination storage server follows the process illustrated in FIG. 7C. The process 763 returns at block 769.

FIG. 7C is a flow diagram illustrating a process for establishing an individual data block of a selected file at the destination storage server, in various embodiments. The process 770 starts at block 771. At block 772, the destination storage server determines whether the data structure of the selected file indicates that the block of the selected file is shared with the reference file. If not, the process continues to block 778. If so, the process continues to block 774, where the destination determines whether the corresponding shared block in the reference file has been overwritten. If so, the process continues to block 778.

Otherwise the process continues to block 776, where the destination storage server establishes the block in the selected file by referencing the corresponding block in the reference file stored at the destination storage server.

At block 778, the destination storage server fetches the block of the selected file from the source storage server. At block 780, the destination storage server establishes the block in the selected file at the destination storage server using the fetched block. At block 795, the process 770 returns.

In some embodiments, the destination storage server can create the reference file and the selected file using absent allocation operations. An absent allocation operation creates a file by creating metadata of the file without actually allocating data blocks for storing the actual contents of the file. When the destination storage server tries to establish the selected file, the server can check whether the data blocks of the reference file have been absent-allocated in the destination storage server. If the data blocks of the reference file have not been absent-allocated yet (e.g., this can happen when the reference file and the selected file are migrated in parallel), the destination storage server can delay or suspend the process for establishing the selected file until the data blocks of the reference file have been absent-allocated in the destination storage server. Once the relevant absent-allocations are performed for the reference file, the destination storage server can continue to establish the selected file by referencing one or more shared data blocks of the reference file.

In some alternative embodiments, the destination storage server can store some special data blocks that are commonly contained in the files. For example, the destination storage server can store a data block containing only zeros. The destination storage server can assign special volume block numbers to these special data blocks. Files stored at the destination storage server can reference that data block containing zeros using the special volume block numbers, instead of allocating a separate data block storing zeros.

In some embodiments, the destination server can detect and verify that the reference file is already present on the destination server, and that the reference file is identical to the reference file on the source server. One way for verifying is to communicate with the source server to compare the associated metadata, checksums, cryptographic hashes, or log records for the reference files. Once the destination server verifies that the reference file on the destination server is identical to the reference file on the source server, selected files can be established at the destination server and can reference data blocks of the local reference file, without a need to explicitly transfer the reference file blocks from the source server.

Alternatively, the reference file and the selected file(s) can be copied and allocated in parallel. The creation process for a selected file can wait if there is a data block of the reference file that needs to be shared with the selected file and has not been transferred yet. The creation process for the selected file can also trigger a fetch request for that block or trigger an absent allocation operation.

FIG. 8 is a high-level block diagram showing an example of processing system in which at least some operations related to technology disclosed herein can be implemented. In the illustrated embodiment, the processing system 800 includes one or more processors 810, memory 811, a communication device 812, and one or more input/output (I/O) devices 813, all coupled to each other through an interconnect 814. The interconnect 814 may be or include one or more conductive traces, buses, point-to-point connections, controllers, adapters and/or other conventional connection devices. The processor(s) 810 may be or include, for example, one or more general-purpose programmable microprocessors, microcontrollers, application specific integrated circuits (ASICs), programmable gate arrays, or the like, or a combination of such devices. The processor(s) 810 control the overall operation of the processing device 800.

Memory 811 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 811 may store data and instructions that configure the processor(s) 810 to execute operations in accordance with the techniques described above. The communication device 812 may be or include, for example, an Ethernet adapter, cable modem, Wi-Fi adapter, cellular transceiver, Bluetooth transceiver, or the like, or a combination thereof. Depending on the specific nature and purpose of the processing device 800, the I/O devices 813 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

What is claimed is:

1. A method comprising:
receiving, at a destination computing device, an indication of a reference file and a first selected file;
receiving, from a source computing device, data blocks of the reference file and a first data structure corresponding to the first selected file, wherein the first data structure is a bitmap with a bit for each data block of the first selected file, each of the bits indicating whether an associated data block of the first selected file is shared with the reference file as determined by the source computing device;
creating a metadata structure for the first selected file comprising references to the shared data blocks in the reference file based, at least in part, on the first data structure;
receiving, from the source computing device, data blocks of the first selected file that are not shared between the reference file and the first selected file; and
updating the metadata structure for the first selected file with locations of the data blocks of the first selected file that are not shared between the reference file and the first selected file.

2. The method of claim 1, wherein the first data structure is generated based, at least in part, on a comparison of block locations on the source computing device for data blocks of the reference file with block locations on the source computing device for data blocks of the first selected file.

3. The method of claim 1, wherein the first data structure also indicates offset numbers within the reference file for the data blocks shared by the first selected file.

4. The method of claim 1, further comprising:
receiving, at the destination computing device, a second data structure corresponding to a second selected file, wherein the second data structure indicates data blocks of the second selected file that are shared with the reference file;
creating a metadata structure for the second selected file comprising references to the shared data blocks in the reference file based, at least in part, on the second data structure; and
based on receipt of a request to access the second selected file at the destination computing device,
sending a request to the source computing device to retrieve data blocks of the second selected file indicated as not shared with the reference file in the second data structure;
completing creation of the second selected file, wherein completing creation of the second selected file comprises updating the metadata structure for the second selected file with locations of the retrieved data blocks; and
providing the second selected file in response to the request to access the second selected file.

5. The method of claim 1, further comprising:
identifying, at the source computing device, a plurality of files which have shared data blocks, wherein the plurality of files comprises the reference file and the first selected file; and
determining a file of the plurality of files to be the reference file based, at least in part, on one or more of a size of the file, an age of the file, and an application which created the file.

6. The method of claim 1, further comprising:
based on determining that at least a first data block shared by the reference file with the first selected has been overwritten on the destination computing device,
sending a request to the source computing device to retrieve an unmodified version of the first data block; and
updating a reference to the first data block in the metadata structure for the first selected file to reference the retrieved unmodified version of the first data block.

7. A non-transitory machine readable medium comprising program code for efficient storage migration, the program code executable to:
receive an indication of a reference file and a first selected file and separately receive data blocks of the reference file and a first data structure corresponding to the first selected file, wherein the first data structure is a bitmap with a bit for each data block of the first selected file, each of the bits indicating whether an associated data block of the first selected file is shared with the reference file as determined by a source computing device;
create a metadata structure for the first selected file comprising references to the shared data blocks in the reference file based, at least in part, on the first data structure;
receive data blocks of the first selected file that are not shared between the reference file and the first selected file; and update the metadata structure for the first selected file with locations of the data blocks of the first selected file that are not shared between the reference file and the first selected file.

8. The machine readable medium of claim 7, wherein the first data structure is generated based, at least in part, on a comparison of block locations on the source computing device for data blocks of the reference file with block locations on the source computing device for data blocks of the first selected file.

9. The machine readable medium of claim 7, wherein the first data structure also indicates offset numbers within the reference file for the data blocks shared by the first selected file.

10. The machine readable medium of claim 7, further comprising program code executable to:
receive a second data structure corresponding to a second selected file, wherein the second data structure indicates data blocks of the second selected file that are shared with the reference file;
create a metadata structure for the second selected file comprising references to the shared data blocks in the reference file based, at least in part, on the second data structure; and
based on receipt of a request to access the second selected file,
send a request to the source computing device to retrieve data blocks of the second selected file indicated as not shared with the reference file in the second data structure;
complete creation of the second selected file, wherein the machine executable code which when executed by at least one machine, causes the machine to complete creation of the second selected file comprises machine executable code which when executed by at least one machine, causes the machine to update the metadata structure for the second selected file with locations of the retrieved data blocks; and
provide the second selected file in response to the request to access the second selected file.

11. The machine readable medium of claim 7, further comprising program code executable to:
identify a plurality of files which have shared data blocks, wherein the plurality of files comprises the reference file and the first selected file; and
determine a file of the plurality of files to be the reference file based, at least in part, on one or more of a size of the file, an age of the file, and an application which created the file.

12. A computing device comprising:
a processor; and
a machine readable medium comprising machine executable code having stored thereon instructions executable by the processor to cause the computing device to,
receive an indication of a reference file and a first selected file;
receive, from a source computing device, data blocks of the reference file and a first data structure corresponding to the first selected file, wherein the first data structure is a bitmap with a bit for each data block of the first selected file, each of the bits indicating whether an associated data block of the first selected file is shared with the reference file as determined by the source computing device;

create a metadata structure for the first selected file comprising references to the shared data blocks in the reference file based, at least in part, on the first data structure;

receive, from the source computing device, data blocks of the first selected file that are not shared between the reference file and the first selected file; and update the metadata structure for the first selected file with locations of the data blocks of the first selected file that are not shared between the reference file and the first selected file.

13. The computing device of claim 12, wherein the first data structure is generated based, at least in part, on a comparison of block locations on the source computing device for data blocks of the reference file with block locations on the source computing device for data blocks of the first selected file.

14. The computing device of claim 12, wherein the first data structure also indicates offset numbers within the reference file for the data blocks shared by the first selected file.

15. The computing device of claim 12, further comprising machine executable code having stored thereon instructions executable by the processor to cause the computing device to:

receive, at the destination computing device, a second data structure corresponding to a second selected file, wherein the second data structure indicates data blocks of the second selected file that are shared with the reference file;

create a metadata structure for the second selected file comprising references to the shared data blocks in the reference file based, at least in part, on the second data structure; and based on receipt of a request to access the second selected file at the destination computing device, send a request to the source computing device to retrieve data blocks of the second selected file indicated as not shared with the reference file in the second data structure;

complete creation of the second selected file, wherein the machine executable code having stored thereon instructions executable by the processor to cause the computing device to complete creation of the second selected file comprises machine executable code having stored thereon instructions executable by the processor to cause the computing device to update the metadata structure for the second selected file with locations of the retrieved data blocks; and provide the second selected file in response to the request to access the second selected file.

16. The computing device of claim 12, further comprising machine executable code having stored thereon instructions executable by the processor to cause the computing device to:

identify, at the source computing device, a plurality of files which have shared data blocks, wherein the plurality of files comprises the reference file and the first selected file; and determine a file of the plurality of files to be the reference file based, at least in part, on one or more of a size of the file, an age of the file, and an application which created the file.

17. The computing device of claim 12, further comprising machine executable code having stored thereon instructions executable by the processor to cause the computing device to:

based on a determination that at least a first data block shared by the reference file with the first selected has been overwritten on the destination computing device, send a request to the source computing device to retrieve an unmodified version of the first data block; and update a reference to the first data block in the metadata structure for the first selected file to reference the retrieved unmodified version of the first data block.

* * * * *